United States Patent [19]

Rundel

[11] Patent Number: 5,581,254
[45] Date of Patent: Dec. 3, 1996

[54] ELECTRIC MOTOR CONTROL CHIP AND METHOD

[75] Inventor: Bernd M. Rundel, Tucson, Ariz.

[73] Assignee: Burr-Brown Corporation, Tucson, Ariz.

[21] Appl. No.: 220,289

[22] Filed: Mar. 30, 1994

[51] Int. Cl.⁶ .................................................. H03M 1/12
[52] U.S. Cl. ......................... 341/155; 318/811; 341/122
[58] Field of Search .................................. 318/798–815; 341/122, 144, 150, 155, 165

[56] References Cited

U.S. PATENT DOCUMENTS

| | | | |
|---|---|---|---|
| 3,720,866 | 3/1973 | Avellar et al. | 318/654 |
| 3,820,063 | 6/1974 | Sexton et al. | 340/18 |
| 4,250,544 | 2/1981 | Alley | 364/110 |
| 4,290,001 | 9/1981 | Espelage | 318/811 |
| 4,371,921 | 2/1983 | Cushman | 364/138 |
| 4,434,390 | 2/1984 | Elms | 318/778 |
| 4,453,117 | 6/1984 | Elms et al. | 318/778 |
| 4,748,554 | 5/1988 | Gebauer et al. | 364/474 |
| 4,761,703 | 8/1988 | Fliman et al. | 361/23 |
| 4,827,195 | 5/1989 | Newell et al. | 318/49 |
| 4,914,386 | 4/1990 | Zocholl | 324/158 |
| 4,989,001 | 1/1991 | Serev | 341/116 |
| 5,047,665 | 9/1991 | Burt | 307/355 |
| 5,194,790 | 3/1993 | Niimi | 318/567 |
| 5,206,572 | 4/1993 | Faraq et al. | 318/778 |
| 5,270,640 | 12/1993 | Kohler et al. | 324/158 |

FOREIGN PATENT DOCUMENTS

| | | |
|---|---|---|
| 1058-695 | 7/1979 | Canada . |
| 3406269 | 8/1984 | Germany . |
| 52-9813 | 1/1977 | Japan . |
| 54-147416 | 11/1979 | Japan . |
| 57-19801 | 2/1982 | Japan . |
| 58-3586 | 1/1983 | Japan . |
| 745840 | 3/1956 | United Kingdom . |
| 92/15148 | 9/1992 | WIPO . |

*Primary Examiner*—Brian K. Young
*Attorney, Agent, or Firm*—Cahill, Sutton & Thomas P.L.C.

[57] ABSTRACT

A conversion circuit digitizes first and second differential analog signals conducted by first and second conductors for digital processing in a motor control system. The conversion circuit includes an analog-to-digital conversion circuit. The analog-to-digital conversion circuit includes a CDAC having a charge summing conductor connected to an input of a bit decision comparator and first and second simultaneously sampled differential sample and hold MSB circuits connected to the charge summing conductor. The first and second differential analog signals are simultaneously sampled and held in the first and second differential sample and hold MSB circuits, respectively, and then are sequentially converted to digital numbers by the analog-to-digital conversion circuit. The first and second analog signals are processed as differential signals all the way from the analog input of the conversion circuit to inputs of a bit decision comparator in the analog-to-digital conversion circuit, and thereby maintain a high level of common mode noise rejection. Programmable reference voltage levels are supplied to the analog-to-digital conversion circuit to accommodate a wide range of amplitudes of the first and second differential analog signals.

20 Claims, 5 Drawing Sheets

ELECTRIC MOTOR CONTROL CHIP AND METHOD

BACKGROUND OF THE INVENTION

The invention relates to a semiconductor chip for (1) receiving analog inputs representative of primary winding currents of an electrical motor, motor shaft rotation, load shaft rotation or other load movement, and various analog signals, all having a wide range of possible magnitudes, and (2) generating serial digital control output information to be digitally processed and used to control and/or monitor the operation of the motor.

Figure 1:
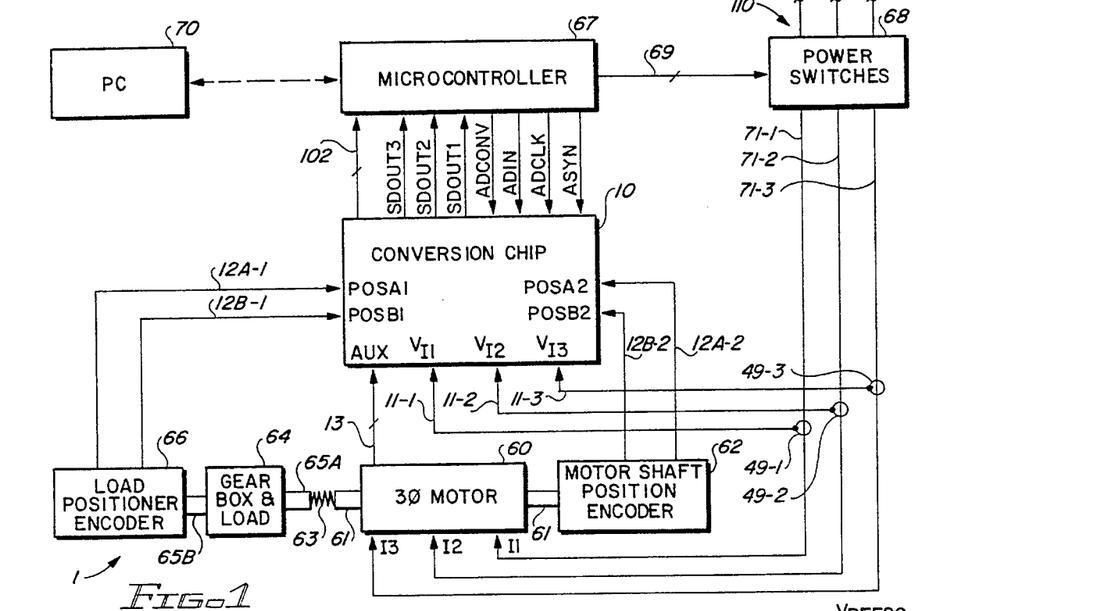
FIG. 1 is a block diagram generally illustrating a versatile motor control system including the improved conversion chip 10 of the present invention and a microcontroller 67 connected to monitor and/or control a motor 60 and its load.
Figure 2:
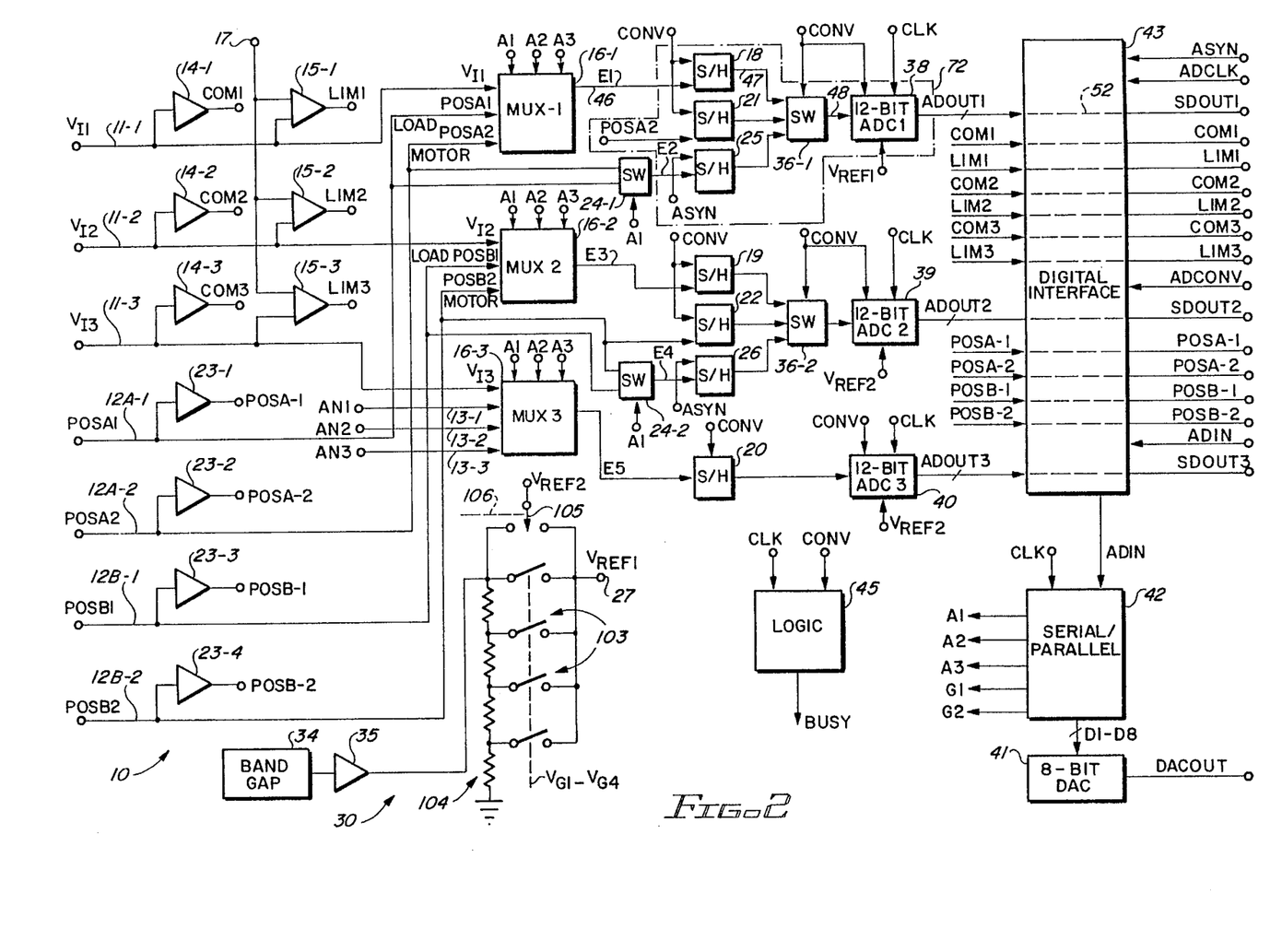
FIG. 2 is a block diagram showing both the features of the closest prior art and the improvements of the electric motor control chip of the present invention.

FIG. 2 is a generalized block diagram of a semiconductor chip 10 that is specifically designed to be a general purpose electric motor control chip. The diagram of FIG. 1 discloses both the closest features of the prior art and also the improvements of the present invention.

The prior art features include three pairs of differential inputs 11-1, 11-2 and 11-3 carrying differential voltages $V_{I1}$, $V_{I2}$ and $V_{I3}$ that represent the primary winding currents $I_1$, $I_2$, and $I_3$, respectively. Each differential voltage is applied by a corresponding external differential amplifier (not shown) that measures the output of a current sensor that senses the amount of AC current $I_1$, $I_2$, and $I_3$, respectively, flowing in the corresponding primary windings of a three-phase electric motor. The resulting three AC differential voltages $V_{I1}$, $V_{I2}$ and $V_{I3}$ are applied to the inputs of three comparators 14-1, 14-2, and 14-3, respectively, to convert the AC differential current sense output signals to square wave signals supplied as outputs of chip 10. Those square wave signals can be used to provide early detection of phase changes in the primary winding currents, and that information can be used to improve motor control. The prior system includes window comparators 15-1, 15-2, and 15-3. The outputs of these comparators are supplied as outputs of chip 10 and can be used to compare the amplitudes of the primary currents $I_1$, $I_2$ and $I_3$ with preselected limit values and make suitable corrections to the primary winding currents.

Chip 10 also receives a pair of differential position-indicating signals POSA1 and POSA2 on conductors 12A-1 and 12A-2, and a second pair of differential position-indicating signals POSB1 and POSB2 on conductor pairs 12B-1 and 12B-2. POSA1 represents the value of a sine wave signal representing position of (for example) a load and POSB1 represents the sine of the position-indicating signal that typically is 90 degrees out of phase with POSA1 for the same load. Similarly, POSA2 and POSB2 represent two position-indicating signals from a motor driving the load. Such differential position-indicating signals are applied between the inputs of comparators 23-1 through 23-4, respectively. The outputs of these comparators also are provided as outputs of chip 10. Three pairs of "general purpose" differential analog input signals AN1, AN2, and AN3 are applied by conductor pairs 13-1, 13-2, and 13-3, respectively, to inputs of a multiplexer designated MUX 3. In the prior art, the differential input voltages $V_{I1}$, $V_{I2}$, and $V_{I3}$ are applied to inputs of multiplexers MUX 1, MUX 2, and MUX 3 (designated by numerals 16-1, 16-2, and 16-3), the outputs of which are sampled by sample and hold circuits 18, 19, and 20, respectively. Analog switch 24-1 selectively applies POSA1 or POSA2 to the input of sample and hold circuit 25, which asynchronously samples in response to the signal ASYN to apply the selected analog input signal to an input of analog switch 36-1A. Similarly, analog switch 24-2 selectively applies POSB1 or POSB2 to the analog input of sample and hold circuit 26, which is asynchronously sampled in response to ASYN. Sample and hold circuit 26 applies the sampled signal to an input of analog switch 36-1B. Sampling is in response to the asynchronous signal ASYN. Multiplexer MUX 1 can be switched to select the position-indicating differential signals POSA1 and POSA2 and multiplexer MUX2 can be switched to select the position-indicating differential signals POSB1 and POSB2. Analog switches 36-1A and 36-1B select the outputs of the various sample and hold circuits and apply them to the inputs of three analog-to-digital converters 38, 39 and 40. The output of multiplexer MUX 3 is sampled by sample and hold circuit 20 and applied to the input of a third analog-to-digital converter 40. The outputs ADOUT1, ADOUT2 and ADOUT3 of analog-to-digital converters 38, 39, and 40 are supplied as outputs of motor control chip 10.

Note that the foregoing are the features of the closest prior art. The remaining features of FIG. 2 are provided in accordance with the present invention.

It should be appreciated that the conventional approach for accommodating a wide range of amplitudes of analog input signals in instrumentation data acquisition systems has been to use a programmable gain amplifier to match the amplitude of an input signal to the full input range of an analog-to-digital converter. Conventionally, the gain inputs of the programmable gain amplifier provide a large range of incremental programmable gain input values, to thereby allow optimum amplification of analog input signals without overdriving the programmable gain amplifier. However, programmable gain amplifiers and their control circuits are quite expensive, and typically are subject to offset errors, gain errors, errors which are a function of temperature, and errors caused by power supply variation. In addition to these error sources, an overdriven programmable gain amplifier has a very slow recovery time. All of these error sources could be very critical in the application of obtaining acceptable performance of a general purpose motor control system and could seriously interrupt smooth motor operation. Such interruption of smooth motor operation can be very inconvenient in certain motor-driven positioning systems, such as a precision plotter or the like.

It should be appreciated that prior motor controllers generally have been designed and implemented on PC (printed circuit) boards for specific, rather than general applications. Consequently, the design and implementation costs have been higher than desirable, and certainly much higher than would be the case if a "general purpose" motor controller, applicable to a wide range of electric motor control applications, could, as a practical matter, be economically implemented on one or two integrated circuit chips. However, this has not been achieved, and there remains an unmet need for an economical, versatile, general purpose motor controller system.

SUMMARY OF THE INVENTION

It is a general object of the invention to provide an economical general purpose electric motor control circuit and method which receives virtually any analog signal that could be involved in electric motor control and produces therefrom digital control signals that can be utilized to accurately monitor and control motor and load speed, shaft position, and the like.

It is another object of the invention to preserve a high degree of accuracy of conversion of analog input signals to digital values for an integrated circuit used in motor control applications.

It is another object of the invention to provide an integrated circuit motor control chip which can accommodate analog input signals having a wide range of amplitudes without using programmable gain amplifiers, without experiencing delays associated with recovery of overdriven programmable gain amplifiers, and without experiencing other errors associated with programmable gain amplifiers.

It is another object of the invention to provide an integrated circuit control chip for various industrial control applications which provides a high signal-to-noise ratio for all signals despite operation of the chip in an environment containing a high degree of electrical noise.

It is another object of the invention to provide an integrated circuit control chip, such as a motor control chip, which provides a very high degree of common mode noise rejection, to thereby provide a high signal-to-noise ratio for all analog signals despite operation of the chip in a high noise environment.

It is another object of the invention to provide an integrated circuit for receiving control signals, such as analog motor control signals, and generating digital signal levels for digital processing, wherein the integrated circuit is inexpensive, is capable of receiving a wide range of input signal magnitudes without being "overdriven" so as to necessitate recovery delay, and is capable of simultaneously sampling multiple analog signal information, such as motor shaft position information and load position information and rapidly and accurately generating digitized outputs representative of such information.

Briefly described, and in accordance with one embodiment thereof, the invention provides a conversion circuit for digitizing first and second analog signals, for example, for digital processing in a motor control system including a motor and a load driven thereby. First and second conductors conduct the first and second analog signals. The circuit includes an analog-to-digital conversion circuit including a CDAC with a charge summing conductor connected to an input of a bit decision comparator and first and second simultaneously sampled sample and hold MSB circuits each coupled to the charge summing conductor.

In the described embodiment, the first analog signal is a differential signal carried by the first and second conductors, and the second analog signal is a differential signal carried by third and fourth conductors. The first sample and hold MSB circuit includes a first MSB switch circuit connected to the first conductor, and a first MSB capacitor having first and second terminals, the first terminal of the first MSB capacitor being connected to the first conductor through a sampling switch. A first isolation switch selectively couples the second terminal of the first MSB capacitor to the first charge summing conductor during conversion of the first differential analog signal to a digital number. A first MSB capacitor grounding switch couples the second terminal of the first MSB capacitor to a ground reference voltage during simultaneous sampling of the first and second sample and hold MSB circuits. A second MSB switch circuit is connected to the second conductor. A second MSB capacitor includes first and second terminals, the first terminal of the second MSB capacitor being connected to the second conductor through a sampling switch. A second isolation switch selectively couples the second terminal of the second MSB capacitor to the second charge summing conductor during conversion of the first differential analog signal to a digital number. A second MSB capacitor grounding switch couples the second terminal of the second MSB capacitor to the ground reference voltage during simultaneous sampling of the first and second sample and hold MSB circuits.

The second sample and hold MSB circuit includes a third MSB switch circuit connected to the third conductor, and a third MSB capacitor having first and second terminals, the first terminal of the third MSB capacitor being connected through a sampling switch to the third conductor. A third isolation switch selectively couples the second terminal of the third MSB capacitor to the first charge summing conductor during conversion of the second differential analog signal to a digital number. A third MSB capacitor grounding switch couples the second terminal of the third MSB capacitor to the ground reference voltage during simultaneous sampling of the first and second sample and hold MSB circuits. A fourth MSB switch circuit is connected to the fourth conductor. A fourth MSB capacitor includes first and second terminals, the first terminal of the fourth MSB capacitor being connected to the fourth conductor through a sampling switch. A fourth isolation switch selectively couples the second terminal of the fourth MSB capacitor to the second charge summing conductor during conversion of the second differential analog signal to a digital number. A fourth MSB capacitor grounding switch couples the second terminal of the fourth MSB capacitor to the ground reference voltage during simultaneous sampling of the first and second differential sample and hold MSB circuits. The first and second differential analog signals are simultaneously sampled and held in the first and second differential sample and hold MSB circuits, respectively, and then sequentially converted to digital numbers by the analog-to-digital conversion circuit. The differential treatment of the analog signals all the way from the inputs of the conversion circuit to the inputs of the bit decision comparator results in very high common mode noise rejection. Programmable reference voltage levels are supplied to the analog-to-digital conversion circuit to accommodate a wide range of amplitudes of the first and second differential analog signals. The digital numbers are processed by a microcontroller to adjust the primary winding currents supplied to the motor.

DETAILED DESCRIPTION OF THE PREFERRED EMBODIMENTS

Referring now to FIG. 1, motor control system 1 includes conversion chip 10 and a microcontroller 67 which is connected by control lines 69 to power switches 68. Power switches 68 control switching of current (by controlling its duty cycle) from three-phase power lines 110 to apply controlled primary winding currents I1, I2, and I3 in conductors 71-1, 71-2, and 71-3, respectively, of three-phase motor 60. Microcontroller 67 optionally may be connected to a personal computer (PC) 70 if operator interface with motor control system 1 is desired.

Three-phase motor 60 has a shaft 61 to which a motor shaft position encoder 62 is attached. Motor shaft position encoder 62 produces position signals POSA2 and POSB2 as inputs to conversion chip 10 on conductors 12A-2 and 12B-2, respectively. Primary winding current sensors 49-1, 49-2, and 49-3 detect the currents I1, I2, and I3 and apply differential AC voltages $V_{I1}$, $V_{I2}$, and $V_{I3}$ to conductors 11-1, 11-2, and 11-3, respectively, as inputs to conversion chip 10. Additional differential analog inputs from motor 60 or other signal producing elements (such as DC supply voltage and primary winding temperature) are input on conductors 13 to conversion chip 10.

Shaft 61 of three-phase motor 60 is connected by mechanical coupling 63 to an input shaft 65A of a gear box/load assembly 64 which has an output shaft or position-indicating element 65B. A load position encoder 66 is connected to shaft 65B and applies load position signals POSA1 and POSB1 via conductors 12A-1 and 12B-1, respectively, to conversion chip 10.

Microcontroller 67 supplies an asynchronous sample signal ASYN, a clock signal ADCLK, a serial data signal ADIN, and a conversion command signal ADCONV to conversion chip 10. Conversion chip 10 supplies to microcontroller 67 the three 12-bit serial analog output data signals SDOUT1, SDOUT2, and SDOUT3. Other signals, including an output clock signal and a busy signal, may be supplied by conversion chip 10 to microcontroller 67 on conductors 102. There are various known techniques for determining motor speed and shaft position other than using shaft position encoders, for example by measuring dynamic temperature changes of the primary windings of the motor, and measuring transient variations of the primary winding currents. The system of FIG. 1 is useful for implementing many such known techniques.

Referring now to FIG. 2, the known features of conversion chip 10 already have been described. According to the present invention, conversion chip 10 further includes sample and hold circuit 21 having its analog input connected to receive the POSA2 signal on conductor 12A-2, its output connected to one of the three inputs of analog switch 36-1A, and its control input connected to receive the CONV signal. Similarly, sample and hold circuit 22 has its analog input connected to receive the POSB2 signal on conductor 12B-2, its output connected to one of the three inputs of switch 36-1B, and its control input connected to receive the CONV signal.

Programmable reference voltage circuit 30 includes a band gap circuit 34, the output of which is connected to the input of a unity gain buffer 35. The output of unity gain buffer 35 is connected to a resistive voltage divider network 104 to produce the reference voltages 2.5 volts, 2.0 volts, 1.0 volts, and 0.5 volts at the upper nodes of each of the four resistors of network 104, respectively. Four switches 103 responsive to control voltages $V_{G1-4}$, respectively, couple the selected reference voltage to the output conductor 27 on which a first reference voltage $V_{REF1}$ is produced. The 2.5 volt output of unity gain buffer 35 is selectively connected by switch 105 in response to a control signal 106 to produce $V_{REF2}$ equal to either 2.5 volts or the voltage selected by switches 103, in order to accomplish the function of applying a different reference voltage to analog-to-digital converter 40 than to analog-to-digital converters 38 and 39.

The $V_{REF1}$ voltage on conductor 27 is applied to the reference voltage inputs of 12 bit analog-to-digital converters 38 and 39, and the $V_{REF2}$ signal is applied to the reference voltage input of 12 bit analog-to-digital converter 40. A detailed implementation of programmable reference voltage circuit 30 is shown and described subsequently with reference to FIG. 5. The reference voltages $V_{REF1C}$, $V_{REF1T}$, $V_{REF2C}$, and $V_{REF2T}$ are used in the CMOS implementations of the sample/hold/ADC circuits such as 72 in FIGS. 2 and 4.

It should be understood that it is very important that buffer 35 be connected between the output of band gap circuit 34 ($V_{REF0}$ conductor 35A) and resistor divider network 104 so that the noise inherently generated by buffer 35 is divided by network 104 by the same factor as $V_{REF0}$ to obtain the selected value of $V_{REF1C}$. Then, there will be no loss in signal-to-noise ratio for lower selected reference voltages. It should be understood that if the voltage divider network 104 were to be placed at the output of band gap voltage source 34 and the selected divided-down reference voltage then were buffered, the constant amount of noise generated by such buffer would not be divided down by the resistive network, and therefore would be added to and constitute a larger proportion of the smaller selected node voltages on nodes 107, 108, and 109. This would reduce the accuracy of the analog-to-digital converters for analog input signals having small amplitudes. The same is true for temperature-induced variations of $V_{REF0}$. Consequently, the "gain" of the analog-to-digital converters can, in effect, be changed by changing the selected reference voltage applied thereto without decreasing the accuracy of analog-to-digital conversion as a result of internally generated noise or temperature-caused variations in the reference voltages.

Figure 5:
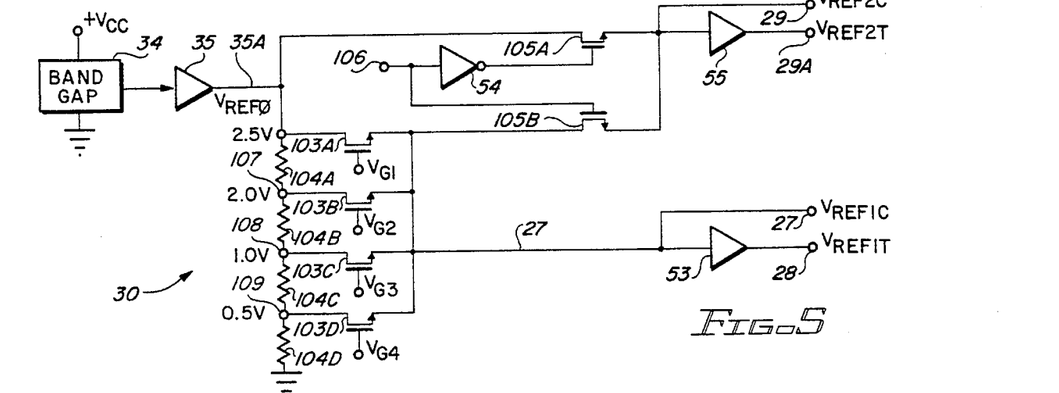
FIG. 5 is a schematic diagram of the programmable reference voltage circuit shown in FIG. 2.

Referring now to FIG. 5, programmable reference voltage circuit 30 includes a conventional 2.5 volt band gap reference voltage circuit 34, the outputs of which are applied to buffer amplifier 35. The output $V_{REF0}$ of buffer amplifier 35 is applied to a resistive voltage divider circuit 104 which includes four series-connected resistors 104A–D to produce four separate output voltages, namely 0.5 volts, 1.0 volts, 2.0 volts, and 2.5 volts on conductors 35A, 107, 108, and 109, respectively. The voltage $V_{REF0}$ is applied by conductor 35A to the drain of N channel MOSFET 105A and across the resistive divider network 104, applying 2.5 volts to the drain of N channel MOSFET 103A, 2.0 volts to the drain of MOSFET 103B, 1.0 volts to the drain of MOSFET 103C, and 0.5 volts to the drain of MOSFET 103D.

The source electrodes of MOSFETs 103A–D are connected by conductor 27 to the input of unity gain buffer 53 and to the drain of N channel MOSFET 105B, so $V_{REF1}$ appears on conductor 27 and an essentially equal buffered reference voltage $V_{REF1T}$ appears on conductor 28. The sources of MOSFETs 105A and 105B are connected to the input of unity gain buffer 55, which produces $V_{REF2C}$ on conductor 29. Conductor 29 is applied to the input of unity gain buffer 55, the output of which produces an essentially equal buffered reference voltage $V_{REF2T}$ on conductor 29A. The gate electrodes of MOSFETs 103A–D are connected to receive gain selection voltages $V_{G1-4}$, respectively. A control signal 106 is applied to gate of MOSFET 105B and the logical complement of signal 106 is applied by CMOS inverter 54 to the gate of MOSFET 105A, so that $V_{REF2C}$ and $V_{REF2T}$ can be made equal to the selected value of $V_{REF1C}$ and $V_{REF1T}$ when the three differential primary winding current-representing voltages $V_{I1}$, $V_{I2}$, and $V_{I3}$ all must be simultaneously converted to digital numbers. (Ordinarily, these three differential signals will have the same amplitude, so the same "gain" will be needed.)

Figure 4A:
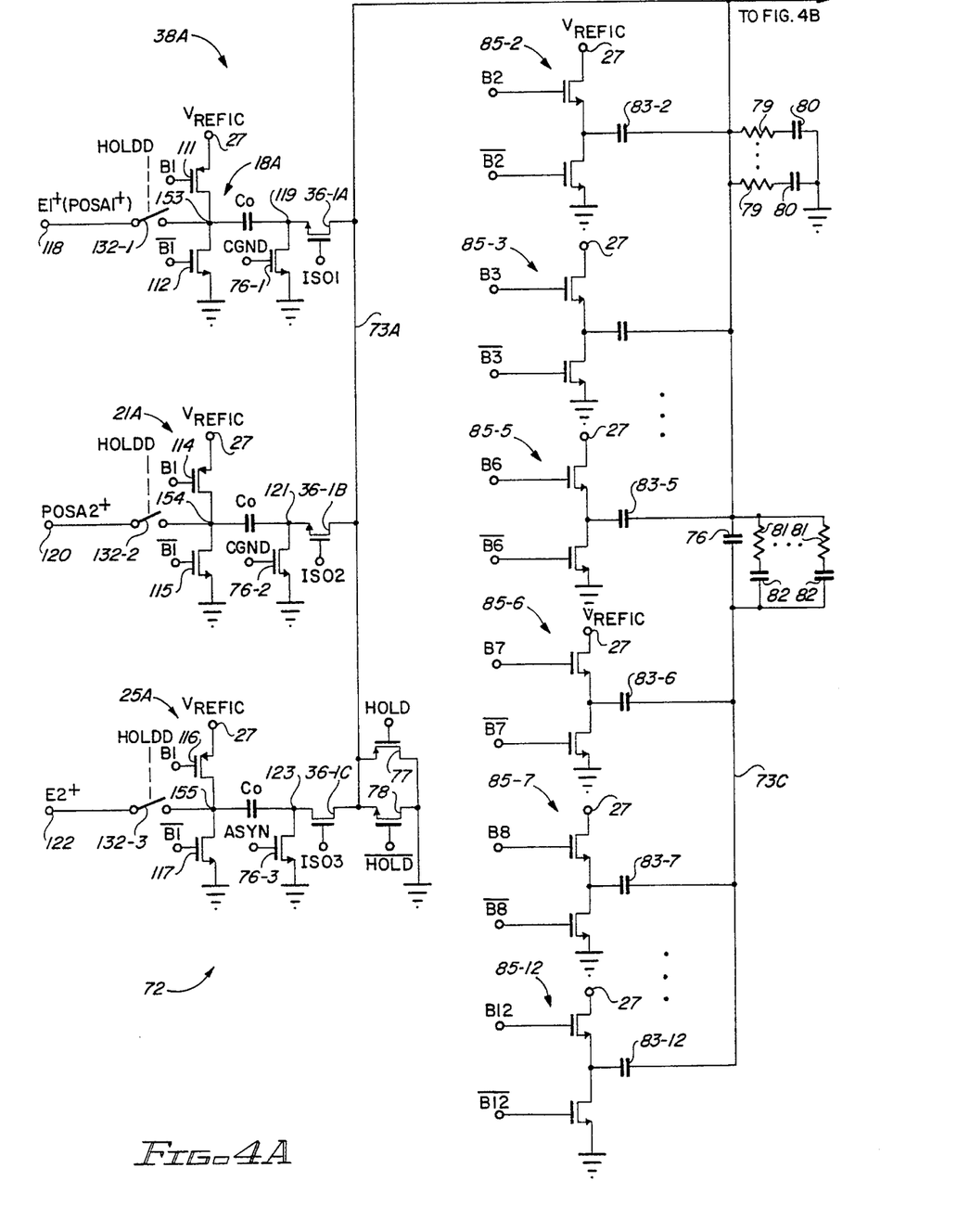
FIGS. 4A and 4B constitute a schematic diagram of one of the analog-to-digital converters shown in FIG. 2.
Figure 4B:
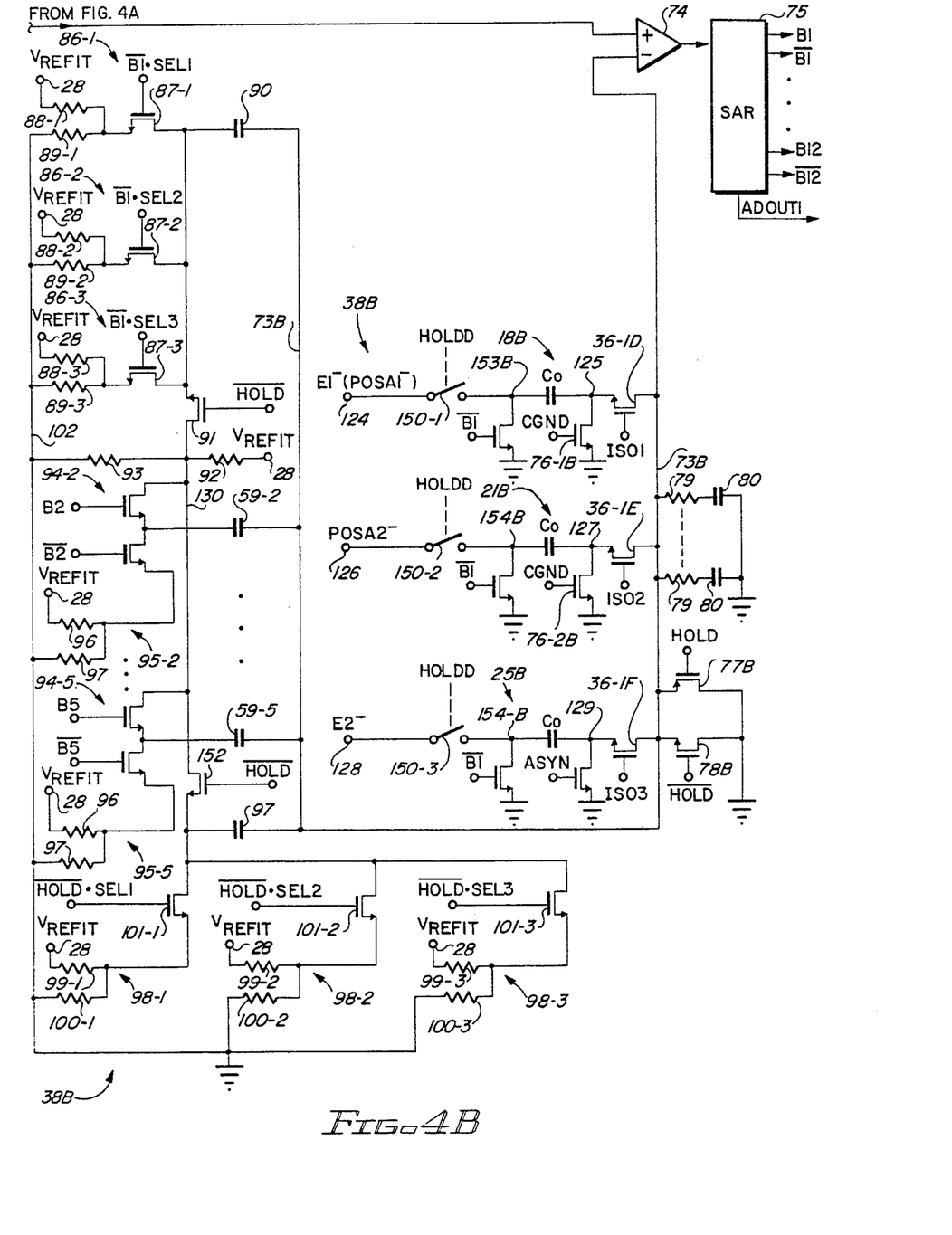

It should be appreciated that the nodes of analog-to-digital converters 38, 39 and 40 to which $V_{REF1C}$ conductor 27 is connected draw essentially no DC current. As can be seen from FIGS. 4A and 4B, $V_{REF1C}$ conductor 27 actually supplies current only to charge up the various bit capacitors of main CDAC 38A. Therefore, no unity gain buffer is needed between selection switches 103A–D and conductor 27. However, $V_{REF1T}$ conductor 28 supplies DC current to various resistive networks in trim CDAC 38B, as shown in FIG. 4. Therefore, unity gain buffer 53 is needed to supply such current to prevent it from influencing the voltages of conductors 107, 108 and 109. Although buffer 53 generates noise which is superimposed on $V_{REF1T}$, this noise is divided down by subsequently described resistors 92 and 93 (FIG. 4B), by a factor of roughly 25, and consequently does not appreciably reduce the accuracy of the voltages on charge summing conductor 73B from which bit decisions are made by bit decision comparator 74.

The above-mentioned ADIN bits G1 and G2 are decoded to produce one of the four gain selection voltages $V_{G1}$–$V_{G4}$. The value of $V_{REF1C}$ on conductor 27 is applied directly to the main CDAC portions of analog-to-digital converters 38 and 39, and essentially the same value of $V_{REF1T}$ on conductor 28 is applied to the "trim CDAC" portions of analog-to-digital converters 38 and 39, as seen later in FIG. 4.

The above described programmable reference voltage technique allows a wide range of input signal magnitudes to be applied to the inputs of analog-to-digital converters 38, 39, and 40 at a much lower cost and at much higher speed than the prior art technique using programmable gain amplifiers. The technique of using programmable reference voltages for analog-to-digital converters 38, 39 and 40 also avoids other problems associated with the programmable gain amplifiers used in the prior art, such as offset drift, nonlinearities with respect to temperature, and gain mismatch errors (ie., mismatch of gains of the various channels).

Figure 6:
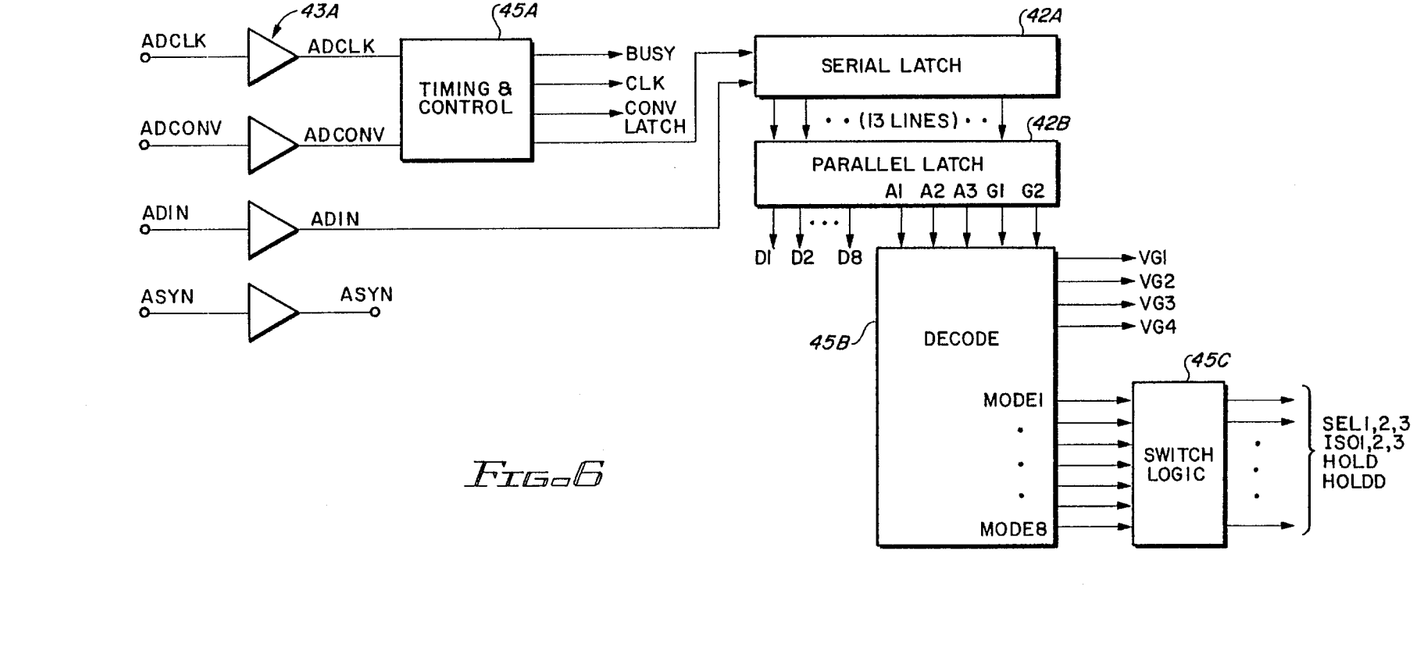
FIG. 6 is a detailed block diagram of circuitry included in the interface circuit 43, serial/parallel conversion circuit 42, and logic circuitry 45 of FIG. 2.

Referring now to FIGS. 2 and 6, digital interface circuit 43 receives the four digital input signals including ASYN, ADCLK, ADIN, and ADCONV and buffers them by unity gain buffers 43A of FIG. 6 for use within conversion chip 10. (Numeral 52 in interface circuit 43 can represent either direct connections and/or connections by means of unity gain buffers.) The buffered signals ADCLK and ADCONV are applied to inputs of timing and control circuit 45A, which is included in logic circuit 45 of FIG. 2. A signal BUSY (which indicates end of conversion) is provided for external use to indicate whether conversion chip 10 is in a conversion or sampling mode. The LATCH signal performs the function of latching the serial data from serial latch 42A into and to parallel latch 42B. The internal signal CLK applied to various circuits within conversion chip 10 is slightly delayed from the buffered clock signal ADCLK (See FIG. 6) and synchronized with ADCONV. The internal signal CONV produced by timing and control circuit 45A is derived from the buffered input signal ADCONV by performing the function of synchronizing it with CLK.

The buffered serial input data signal ADIN is applied to the serial input of a 13 bit serial latch circuit 42A, the individual latch outputs of which are applied to the inputs of a parallel latch circuit 42B. Serial latch 42A and parallel latch 42B form serial/parallel converter 42 in FIG. 2. The eight data bits D1, D2 . . . D8 of ADIN are applied to the eight inputs of an 8 bit digital-to-analog converter 41. Digital-to-analog converter 41 produces the external analog signal DACOUT, which can be used for various purposes. The mode select outputs A1, A2 and A3 and the reference voltage selection signals G1 and G2 in parallel latch 42B are applied to inputs of decode circuit 45B (which is included in logic circuit 45 of FIG. 2) to produce the eight mode signals MODE1, MODE . . . MODE8. MODE1, MODE2 . . . MODE8 are applied to the inputs of switch logic circuit 45C to produce the various control signals such as SEL1, SEL2, SEL3, IS01, IS02, IS03, HOLD, and HOLDD needed to effectuate operation of analog-to-digital converter 72 as shown in FIG. 4. Such logic circuitry can be easily implemented by one skilled in the art knowing the needed timing signals, and therefore is not described.

In accordance with an important aspect of the present invention, all of the signal paths from input conductors 11-1,2,3, 12A-1,2 and 12B-1,2 to the input of a bit decision comparator 74 in each analog-to-digital converter (see FIGS. 4A and 4B) are differential signal paths, and each includes a pair of conductors on which a differential voltage is carried. Each differential signal path may extend through one of multiplexers 16-1,2,3, one of the analog switches such as 36-1A and 36-1B and/or 24-1 and 24-2, one of the sample and hold circuits, and through the CDAC (capacitor digital-to-analog converter) portion of successive approximation analog-to-digital converters 38, 39, and 40 to the internal bit decision comparator 74 (FIG. 6) which makes successive approximation decisions as to whether each bit is to be a "1" or a "0".

As previously mentioned, motor control systems usually operate in environments having a large amount of electrical noise. It should be appreciated that providing the above mentioned differential input signal paths from the analog inputs of conversion chip 10 to the comparators (e.g., 74 of FIGS. 4A and 4B) at which the conversion bit decisions are made causes most of the electrical noise induced onto the various conductors within conversion chip 10 to be common mode noise, and also causes externally induced noise on conductors connected to the differential input terminals of conversion chip 10 to be common mode noise. Such common mode noise therefore is subject to common mode rejection by bit decision comparator 74.

The degree of common mode rejection is influenced not only by the properties of the input stage of bit decision comparator 74, but also by the degree of matching of corresponding elements in main CDAC 38A and trim CDAC 38B in FIGS. 4A and 4B. Ideally, all corresponding bit capacitors and parasitic capacitances in main CDAC 38A and trim CDAC 38B are identical, but as a practical matter they are not identical. In accordance with the present invention, the subsequently described common mode rejection trim circuits each including a number of trim capacitors 80 and interruptible nichrome links 79 connecting such trim circuits to charge summing conductors 73A and 73B, respectively, are provided to improve the above mentioned matching. This results in equal perturbations of charge summing conductors 73A and 73B by noise sources that tend to produce the common mode noise, and hence results in good overall common mode noise rejection, producing considerably improved accuracy of the analog-to-digital conversions made in the high noise environment.

Figure 3:
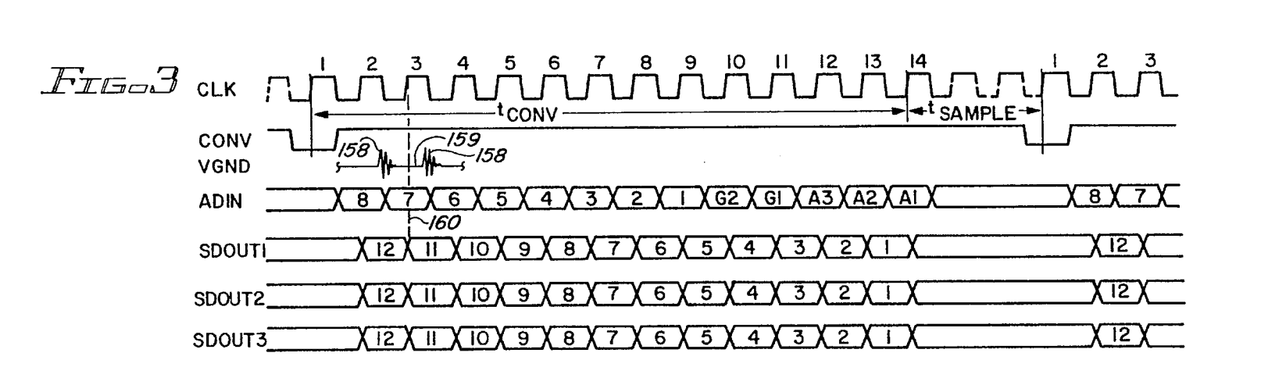
FIG. 3 is a timing diagram useful in explaining the operation of the system shown in FIG. 2.

Before describing the detailed structure and operation of the 12 bit analog-to-digital converters with reference to FIGS. 4A and 4B, it will be helpful to first understand the basic operation of the system as shown in FIG. 2 with reference to the timing diagram of FIG. 3. FIG. 3 shows the CLK, CONV, and ADIN signals generated from the corresponding inputs of conversion chip 10. CLK pulses 1–14 occur during each analog-to-digital conversion cycle, which begins at the rising edge of CLK pulse 1 and continues until the rising edge of the last CLK pulse before the beginning of the next conversion cycle. As indicated from the ADIN waveform in FIG. 3, bit 8 through bit 1 of a digital word to be converted to the analog signal DACOUT are serially latched into serial latch 42A (FIG. 6) by the rising edges of CLK pulses 2–9. The G2, G1, A3, A2, and A1 bits are clocked into serial latch 42A by the trailing edges of CLK pulses 10–14, respectively. Decisions of the comparators (e.g. comparator 74 in FIG. 4) of the three analog-to-digital converters 38, 39 and 40 result in serial outputting of the bits of 12-bit data words SDOUT1, SDOUT2, and SDOUT3 representing the digitized values of the presently selected three analog input signals being converted; the SDOUT1,2,3 waveforms are shown in FIG. 3.

As subsequently will be explained in more detail, each time a serial bit of ADIN is clocked by the signal LATCH into serial latch 42A (FIG. 6), a "ground bounce" voltage may appear on the ground conductor(s) in conversion chip 10, and also on the power supply conductors therein. In the VGND waveform of FIG. 3, numeral 158 illustrates the timing of such ground bounce voltages relative to the CLK waveform. Numeral 160 illustrates when bit decisions are made by bit decision comparator 74 of FIG. 6.

In accordance with the present invention, the LATCH signal is synchronized with and delayed sufficiently relative to CLK to ensure that each ground bouncing voltage 158 has settled down to level 159 before the next bit decision, which occurs at a time such as indicated by dotted line 160. If this technique were not used, it would be necessary to wait until each analog-to-digital conversion is complete and then either 1) load a parallel latch using separate package input leads for each bit of ADIN, respectively, thereby increasing the size and cost of both the package for conversion chip 10 and the printed circuit board into which it is eventually plugged, or 2) serially clock each bit of ADIN into the latch, thereby greatly decreasing the speed of the operation of the system.

Referring now to FIGS. 4A and 4B, 12 bit analog-to-digital converter 38 is shown as actually implemented in CMOS technology in the form of an analog-to-digital converter 72 that includes sample and hold circuits 18, 21, and 25 and switches 36-1A. See dotted line 72 in FIG. 2.

In accordance with the present invention, 12-bit analog-to-digital converter 72 has multiple simultaneous sample and hold capability, whereby multiple analog inputs can be simultaneously sampled and held, and then sequentially converted to digital numbers in a selected order without resampling any of the analog inputs. Analog-to-digital converter 39 of FIG. 2 and its associated sample and hold circuits are implemented similarly, as is generally the case for analog-to-digital converter 40.

Use of "main CDACs" and "trim CDACs" in implementation of successive approximation analog-to-digital converters is well known. However, the provision of the main CDAC structure 38A in FIG. 4A including sample/hold/MSB circuits 18A, 21A, and 25A which incorporate three separate MSB (most significant bit) capacitors $C_0$, respectively for a main CDAC 38A and corresponding sample/hold/MSB circuits 18B, 21B and 25B in a trim CDAC 38B (FIG 4B), in which two or more of the sample and hold circuits can be simultaneously sampled and held, and then individually selected for successive analog-to-digital conversion cycles, is believed to be new.

In FIG. 4A, sample/hold/MSB circuit 18A includes an MSB bit switch 111,112 including a P-type pull-up MOSFET 111 coupled between $V_{REF1C}$ conductor 27 and conductor 153, which is coupled by sample switch 132-1 to multiplexer output signal E1$^+$. The gate of the upper bit switch MOSFET 111 is connected to B1. (It should be noted that the differential signal E1 on differential conductor pair 46 in FIG. 2 is equal to the difference between E1$^+$ and E1$^-$ on conductors 118 and 124 in FIGS. 4A and 4B. The other differential signal POSA2 of FIG. 2 is equal to the difference between POSA2$^+$ and POSA2$^-$ on conductors 120 and 126, respectively in FIG. 4. Similarly, the differential signal E2 of FIG. 2 is the difference between E2$^+$ on conductor 122 and E2$^-$ on conductor 128 in FIGS. 4A and 4B.) As is the conventional practice, B1 and $\overline{B1}$ are not overlapping to avoid pull-up and pull-down bit switch MOSFETs from being simultaneouly turned on.

The drain of N channel pull-down MOSFET 112 is connected to conductor 153, its gate is connected to $\overline{B1}$, and its source is connected to ground. The signals B1, B2 . . . B12 and their logical complements are generated in a well known manner by successive approximation (SAR) circuit 75. An MSB capacitor $C_0$ is connected between conductors 153 and 119. Sample switch 132-1 (which can be an N channel MOSFET or CMOS transmission gate) is connected between conductors 118 and 153. The control electrode of sample switch 132-1 is connected to receive the delayed signal HOLDD, subsequently explained. N channel isolation MOSFET 36-1A is connected between conductor 119 and charge summing conductor 73A of main CDAC 38A. The gate of isolation MOSFET 36-1A is connected to receive the signal ISO1. Capacitor grounding transistor 76-1 is connected between conductor 119 and ground, and has its gate connected to receive the signal CGND.

Charge summing conductor 73A is connected to the non-inverting input of bit decision comparator 74, the inverting input of which is connected to a charge summing conductor 73B of trim CDAC 38B. Charge summing conductor 73A also is connected to sample/hold/MSB circuits 21A and 25A and to the next most significant four bit capacitors 83-2, 83-3 . . . 83-5 and to one terminal of a step-down capacitor 76. The other terminal of step-down capacitor 76 is connected to charge summing conductor 73C, which is connected to the bit capacitors 83-6, 83-7 . . . 83-12 of bits 6–12.

Bit capacitors 83-2, 83-3 . . . 83-5 are binarily weighted with respect to the MSB capacitors $C_0$, and charge summing conductor 73C is connected to binarily weighted bit capacitors 83-6, 83-7 . . . 83-12. The left terminal of each bit capacitor as shown in FIGS. 4A and 4B is connected to a corresponding bit switch 85-2, 85-3 . . . 85-12, each having an N channel pull-up MOSFET having its gate connected to the corresponding bit signal B2, B3 . . . B12 and an N channel pull-down MOSFET having its gate connected to the corresponding complement bit signal $\overline{B2}, \overline{B3} \ldots \overline{B12}$. The drain of each bit switch pull-up MOSFET is connected to $V_{REF1C}$ conductor 27, and the source of each bit switch pull-down MOSFET is connected to ground.

Sample/hold/MSB circuit 21A includes bit switch 114,115 with P channel pull-up MOSFET 114 having its source connected to $V_{REF1C}$ conductor 27, its gate connected to B1, and its drain connected by conductor 154 and sample switch 132-2 to receive the multiplexer signal POSA2$^+$. The drain of N channel pull-down bit switch MOSFET 115 is connected by conductor 154 to one terminal of an MSB capacitor $C_0$, the other terminal of which is connected to conductor 121. Sample switch 132-2 is connected between conductors 120 and 154, and the control electrode of sample switch 132-2 is connected to HOLDD. The source and gate of pull-down MOSFET 115 are connected to ground and $\overline{B1}$, respectively. The second terminal of the MSB capacitor $C_0$ is connected by conductor 121 to the source of N channel isolation MOSFET 36-1B and the drain of capacitor grounding MOSFET 36-1B. The source and gate of capacitor grounding MOSFET 36-1B are connected to ground and CGND, respectively. The drain and gate of isolation MOSFET 36-1B are connected to charge summing conductor 73A and ISO2, respectively.

Sample/hold/MSB circuit 25A includes bit switch 116, 117, wherein P channel pull-up MOSFET 116 and N channel pull-down MOSFET 117 are connected in series between $V_{REF1C}$ conductor 27 and ground. Their respective gates are connected to B1 and $\overline{B1}$, and their drains are connected by conductor 155 and sample switch 132-3 to E2$^+$ and one terminal of MSB capacitor $C_0$, the other terminal of which is connected to conductor 123. Sample switch 132-3 is connected between conductors 122 and 155, and has its control electrode connected to HOLDD. Conductor 123 is connected to the source of N channel isolation MOSFET 36-1C and to the drain of N channel capacitor grounding MOSFET 76-3, the gate and source of which are connected to ASYN and ground, respectively. The gate and drain of N channel isolation MOSFET 36-1C are connected to IS03 and charge summing conductor 73A, respectively.

The sample/hold circuit 18 of FIG. 2 can be implemented by the sample/hold/MSB portions of circuits 18A and 18B in FIGS. 4A and 4B. Similarly, sample and hold circuit 21 of FIG. 2 can be implemented by the sample/hold/MSB portions of circuits 21A and 21B in FIGS. 4A and 4B, and sample/hold circuit 25 can be implemented by the sample/hold/MSB portions of circuits 25A and 25B in FIGS. 4A and 4B. The sample/hold/MSB circuits 18A, 21A, and 25A of main CDAC 38A are coupled by the isolation switches 36-1A, 36-1B, and 36-1C, respectively, to charge summing conductor 73A, and sample/hold/MSB circuits 18B, 21B, and 25B of trim DAC 38B similarly are connected by identical isolation switches to charge summing conductor 73B.

In main CDAC 38A, P channel MOSFET 77 and N channel MOSFET 78, with their drains connected to ground, their sources connected to charge summing conductor 73A, and their gates connected to HOLD and $\overline{HOLD}$, respectively, clamp charge summing conductor 73A to ground at the end of each conversion cycle to establish the same initial condition for the beginning of the next conversion cycle. A similar CMOS transmission gate performs the same function for charge summing conductor 73B of trim CDAC 38B.

A common mode rejection trim circuit is connected to each of charge summing conductors 73A and 73B, respectively. Each includes a plurality of nichrome links 79 which can be interrupted by a laser cut and a plurality of corresponding small trim capacitors 80. By interrupting a suitable number of the nichrome links 79 with laser cuts during testing of conversion chip 10, the common mode rejection of common mode noise signals induced on charge summing conductors 73A and 73B can be optimized.

Similarly, a step-down capacitor trim circuit including a plurality of small trim capacitors 82 and a plurality of corresponding nichrome links 81 is connected in parallel with step-down capacitor 76. By interrupting a suitable number of nichrome links 81 with laser cuts during testing of conversion chip 10, precisely the correct effective value of step-down capacitor 76 can be obtained.

Trim CDAC 38B includes three individually selectable most significant bit capacitors $C_0$, which are selected by isolation MOSFETs 36-1D, 36-1E, and 36-1F similarly to 36-1A, 36-1B, and 36-1C, in response to IS01, IS02, and IS03, respectively, depending upon which sampled and held input signal is to be digitized next. The structure of the three analog sample/hold/MSB circuits 18B, 21B, and 25B of trim CDAC 38B is closely matched to the structure of sample/hold/MSB circuits 18A, 21A, and 25A, respectively, except that the bit switch pull-up MOSFETs such as 111, 114, and 116 have been omitted from the trim CDAC 38B.

The four next most significant bit capacitors 59-2 ... 59-5 of trim CDAC 38B are connected between charge summing conductor 73B and bit switches 94-2 ... 94-5, respectively. The opposite terminal of each such bit capacitor 59-2, etc. is connected by a corresponding pull-down MOSFET to a resistive "trim network" 95-2 ... 95-5, each including voltage divider resistors 96 and 97. In each of bit switches 94-2 ... 94-5, the N channel pull-up MOSFET has its gate electrode connected to B2 and the N channel pull-down MOSFET has its gate electrode connected to $\overline{B2}$. The source of each N channel pull-up MOSFET is connected to conductor 130, and the source of each N channel pull-down MOSFET is connected to the junction between resistors 96 and 97 of the corresponding trim network 95-2 ... 95-5. In each such trim network, the resistor 96 is connected to $V_{REF1T}$ conductor 28, and resistor 97 is connected to ground conductor 102, so that resistors 96 and 97 form a resistive voltage divider between $V_{REF1T}$ and ground conductor 102. Trim resistors 96 and 97 are laser trimmable nichrome resistors.

Conductor 130 is connected to one terminal of nichrome trim resistor 92 of trim divider network 92,93. Trim divider network 92,93 is connected between $V_{REF1T}$ conductor 28 and ground conductor 102. The drain of MOSFET 91 is connected to the junction between trim divider resistors 92 and 93. The gate of N channel MOSFET 91 is connected to $\overline{HOLD}$, and its source is connected to conductor 131.

Differences between the capacitances associated with the three sample/hold/MSB circuits 18A, 21A, and 25A coupled to main CDAC charge summing conductor 73A and the corresponding sample/hold/MSB circuits 18B, 21B, and 25B connected to trim CDAC charge summing conductor 73B can be adjusted by laser trimming nichrome resistors in three corresponding MSB trim networks 86-1, 86-2, and 86-3 coupled by selection MOSFETs 87-1, 87-2 and 87-3 and MSB trim capacitor 90 to charge summing conductor 73B. Conductor 131 connects MSB trim capacitor 90 and the drains of selection MOSFETs 87-1,2,3 and the source of MOSFET 91. Selection MOSFETs 87-1, 87-2 and 87-3 are connected between conductor 131 and the intermediate junctions of MSB trim divider networks 86-1, 86-2 and 86-3, respectively. Trim divider 86-1 includes trimmable nichrome resistor 88-1 and trimmable nichrome resistor 89-1 coupled between $V_{REF1T}$ conductor 28 and ground conductor 102. The gates of selection MOSFETs 87-1,2,3 are connected to control signals that occur during $\overline{B1}$ and correspond to the particular sample/hold/MSB circuit presently being selected by IS01, IS02, or IS03.

Conductor 130 also is connected to the drain of N channel MOSFET 152, the gate of which is connected to $\overline{HOLD}$. The source of MOSFET 152 is connected to one terminal of capacitor 97 and to the drains of MOSFETs 101-1,2,3. The sources of those MOSFETs 101-1 etc. are connected to trimmable resistive dividers 98-1,2,3, respectively, which function as selectable offset trim devices that are selected when the three sample/hold/MSB circuits 18A,B, 21A,B and 25A,B are selected in response to the coincidence of $\overline{\text{HOLD}}$ and SEL1, SEL2 or SEL3, respectively. Each of offset trim circuits 98-1,2,3 includes a resistor 99-1 connected between $V_{REF1T}$ conductor 28 and the source of the corresponding selection transistor 101-1,2,3, and a second resistor 100-1,2,3 connected between conductor 102 and the source of the corresponding selection transistor 101-1,2,3.

Offset trim circuits 98-1, 2 and 3 allow an appropriate offset voltage to be captured on capacitor 97 in FIG. 4 during each occurrence of HOLD (FIG. 4A) and used for adjusting the offset of the analog-to-digital converter by an amount needed for the particular sample/hold/MSB circuit to be selected next for conversion of its already sampled and held analog signal level to a digital number.

The use of a single MSB trim capacitor 90 in conjunction with three selectable resistive trim circuits 89-1,88-1, 89-2, 88-2, and 89-3,88-3 requires less chip area and avoids process-induced mismatches of capacitance that would be inevitable if three separate trim capacitors were used. Similar considerations apply to the three selectable offset circuits 98-1, 2, and 3 in conjunction with a single offset trim capacitor 97.

The basic operation of the ADC 72 of FIGS. 4A and 4B is conventional and will not be repeated, except for the part that pertains to simultaneous sampling and holding by the two sample/hold/MSB circuits 18A,B and 21A,B and subsequent successive conversion of both sampled analog signals to digital numbers, and also to the selective operation of trim CDAC 38B in accordance with digitizing of the stored signal level of whichever of the three sample/hold/MSB circuits 18A,B, 21A,B or 25A,B is presently selected.

Figure 4C:
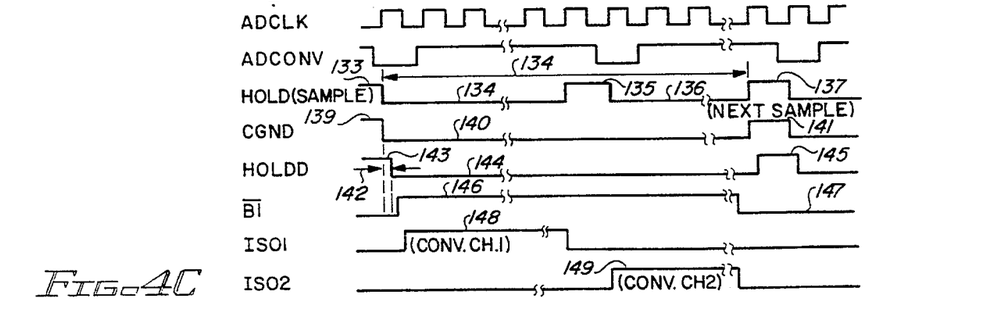
FIG. 4C is a timing diagram useful in explaining the operation of the analog-to-digital converter shown in FIG. 4.

Referring now to FIGS. 4A and 4B and FIG. 4C, the signal HOLD initially is at a "1" level 133 during which time all three sample/hold/MSB circuits may be in their sample modes. During the same time, MOSFETs 77 and 78 are on, grounding main CDAC charge summing conductor 73A. Similarly, the corresponding MOSFETs 77B and 78B ground trim CDAC charge summing conductor 73B. At the same time, CGND is at level 139, so MOSFETs 76-1 and 76-2 are on, grounding nodes 119 and 121, and at the same time corresponding capacitor grounding MOSFETs 112B and 115B in trim CDAC 38B are on, grounding nodes 125 and 127. The sample switches 132-1,2,3 and 150-1,2,3 are closed during the sample mode. During the same sample period, it can be seen that IS01 and IS02 are both at a "0" level (which in this case is −5 volts), so the isolation switches 36-1A and 36-1B all are off during the sampling mode, as are the corresponding isolation switches 36-1D and 36-1E in trim CDAC 38B. During the sample mode, all of the MSB bit switch pull-up MOSFETs and MSB pull-down MOSFETs are off.

In response to a positive edge of ADCLK, HOLD and CGND go from "1" to "0" levels. As HOLD makes its transition from level 133 to level 134, MOSFETs 77 and 78 and also MOSFETs 77B and 78B are turned off, allowing charge summing conductors 73A and 73B to electrically "float". As CGND goes from level 139 to level 140, capacitor grounding MOSFETs 76-1 and 76-2 are turned off, and, similarly, the corresponding capacitor grounding MOSFETs 112B and 115B in trim CDAC 38B are turned off. This allows nodes 119, 121, 125, and 127 to electrically float.

A short delay 142 after the negative-going edge of ADCONV, the delayed hold signal HOLDD goes from level 143 to level 144, opening sample switches 132-1, 2, and 3 in main CDAC 38A and corresponding sample switches 150-1, 2, 3 in trim DAC 38B. Delay 142 is necessary to prevent any redistribution of charge which might occur as a result of switches 132-1 and 76-1 being simultaneously on for an appreciable amount of time.

At this point, the sample/hold/MSB circuits are in their hold modes and analog-to-digital conversion can proceed. Next, $\overline{\text{B1}}$ goes from level 147 to 146, turning on bit switch pull-down MOSFETs 112, 114, and 117, thereby grounding the left hand side of each of the MSB capacitors $C_0$. Then, IS01 goes from level 156 to level 148, thereby selecting sample/hold/MSB circuit 18A, which can also be referred to as "channel 1", for analog-to-digital conversion of the sampled level, which now appears on conductor 119. The successive approximation analog-to-digital conversion procedure then performed is completely conventional, and will not be described in detail. At the end of that conversion, IS01 goes from level 148 to level 156A, turning off isolation MOSFET 36-1A.

Next, HOLD goes from level 134 to level 135, causing charge summing conductors 73A and 73B to be grounded. After HOLD returns from level 135 to level 136, then the next sample/hold/MSB circuit 21A (also referred to as channel 2) is selected by causing IS02 to go from level 157 to level 159, during which the analog level held on conductor 121 is converted to a digital number by the conventional successive approximation procedure. During this time isolation MOSFET 36-1B is turned on, connecting conductor 121 to charge summing conductor 73A and similarly connecting conductor 127 to charge summing conductor 73B. Note that HOLDD remains at a "0" level 144 between the two analog-to-digital conversion cycles, and of course, the sample switches 132-1,2 and 150-1,2 remain open.

Thus, according to one aspect of the present invention, two additional "simultaneous sample and hold" circuits 21 and 22 are coupled to capture and store the differential load-position-indicating input signals POSA2 and POSB2 at exactly the same times at which the differential motor shaft-position-indicating differential POSA1 and POSB1 signals are captured and stored.

This is a very useful feature because the simultaneously captured positions of the motor shaft 61 and the load shaft 65 then can be converted to digital numbers by analog-to-digital converters 38 and 39, and those digital numbers can be output to a computer or microcontroller 67 or other circuit that (1) determines if any overload conditions or slippage between the motor and the load are occurring, and (2) accordingly adjusts the drive currents $I_1$, $I_2$, and $I_3$ in the primary windings of the electric motor, so as to provide a "soft start" of the electric motor or otherwise appropriately adjusts the drive currents $I_1$, $I_2$ and $I_3$. This technique can prevent excessive power drain in the motor during start up, and also can prevent excessive wear or other damage to the motor and/or load caused by excessively hard "start up" of electric motor 60.

In accordance with another aspect of the invention, the magnitudes of the motor input currents $I_1$, $I_2$, and $I_3$ (which represent the magnetic flux in the primary windings of motor 60) and the position-indicating signals POSA1, POSA2, POSB1, and POSB2, and also the miscellaneous analog input signals AN1, AN2 and AN3 often have a large range of values that greatly exceeds the range of input signal magnitude which can be safely applied to the inputs of analog-to-digital converters 38, 39, and 40. (As explained earlier, the conventional approach to acquisition of analog signals having a large range of input signal amplitudes has been to use programmable gain amplifiers to receive the signal and modify or program the gains of the programmable gain amplifiers. This is an expensive technique, especially when implemented in an integrated circuit, because programmable gain amplifiers and their control circuits are complex circuits which require a large amount of chip area. Furthermore, this conventional technique introduces several error sources into analog signals and the digitized representations thereof. Also, this technique results in reduced circuit speed of the motor control circuit 10 in the event that the programmable gain amplifiers must recover from being overdriven by large noise signals or an analog input signal having amplification that exceeds the range of the programmable gain amplifier at the presently set value of gain applied thereto.)

In accordance with the present invention, the above-mentioned use of programmable gain amplifiers is avoided, and programmable reference voltage circuit 30 generates the reference voltages applied to analog-to-digital converters 38, 39, and 40, completely avoiding loss of circuit speed due to recovery of overdriven programmable gain amplifiers, and also requiring far less integrated chip area.

In accordance with another aspect of the present invention, circuit 42 performs a serial-to-parallel conversion of a 13 bit input "configuration word" received as the ADIN signal. Provision of interface circuit 43 greatly reduces the number of leads that otherwise would be required for integrated circuit motor controller chip 10. The complete configuration and operation of analog motor control chip 10 is thereby accomplished with only the four input lines 50, the thirteen output lines 51, and the various needed power supply inputs.

As previously mentioned, high speed switching of bits on a CMOS chip can cause substantial amounts of current to flow through various ground conductors on the chip. Such ground conductors have a finite amount of resistance, so such switching can result in small but significant "ground bounce voltages" being developed across the resistance of the ground conductors. Such ground bounce voltages can be large enough to result in significant errors in the bit decisions made by bit decision comparator 74 of FIG. 4.

In accordance with the present invention, the signal LATCH is synchronized with respect to CLK so that clocking of each bit of the serial data ADIN into serial latch 42A of FIG. 6 is delayed to always occur several hundred nanoseconds after the time 160 (FIG. 3) at which the previous bit decision has been made by comparator 74 and the result has been entered into SAR 75. Then it is ensured that the ground bouncing 158 caused by the serial latching of ADIN during the analog-to-digital conversion process occurs after each bit decision and cannot affect the accuracy thereof. This allows fast serial clocking of ADIN into conversion chip 10 during, rather than after, each 12-bit analog-to-digital conversion process. That provides the benefit of fast clocking of ADIN using only one package lead for ADIN without compromising the speed and accuracy of the 12 bit analog-to-digital conversions being performed by the analog-to-digital converters 38, 39, and 40.

The outputs of sample and hold circuits 18, 21, 19, 22, and 20 are differential, and are applied differentially via switches 36,37 to the internal bit decision comparators of the A/D converters 38, 39 and 40. This provides common mode rejection of noise superimposed on the analog signal to be digitized.

The described conversion chip 10 can be used in the system shown in FIG. 1 to accurately digitize both incremental sensor output signals and conventional resolver output signals. Conversion chip 10 can be utilized in the system of FIG. 1 to compute absolute motor position or load position from incremental sensor signals by using the asynchronous sample and hold circuits 25 and 26 (FIG. 2) to detect initial zero crossing points, and from then on all subsequent sampled, held, and converted position signals can be referenced to the initial positions. The signals AN1, 2 and 3 could, for example, represent the DC voltages from which pulse-width-modulated primary currents used to control the motor are derived. Such DC voltage information can be utilized to compute adjustments for ripple in the DC voltages and thereby avoid the need for large capacitors to absorb ripple in the motor control circuit.

An important aspect of the invention is the provision of an architecture that eliminates use of programmable gain amplifiers from the differential signal paths, to thereby allow both externally and internally induced common mode noise from the high noise environment in which motor control systems typically operate to be eliminated by the common mode rejection of the differential stages in the various comparators and the common mode rejection trim features of the CDAC and the bit decision comparator 74. Replacement of programmable gain amplifiers (which usually are single ended rather than differential circuits) and avoidance of the error sources inherent in them, and replacing this function with low noise programmable reference voltage circuit 30 is important to the high accuracy and low cost of the conversion chip 10.

While the invention has been described with reference to several particular embodiments thereof, those skilled in the art will be able to make the various modifications to the described embodiments of the invention without departing from the true spirit and scope of the invention. It is intended that all combinations of elements and steps which perform substantially the same function in substantially the same way to achieve the same result are within the scope of the invention.

For example, the described conversion chip 10 is especially suitable for use in any controller configuration in which analog signals representing parameters or variables associated with up to three "channels" (for example, three axes coordinates in a robotics system), must be digitized and then input to a microcontroller which then computes adjustments to electric motors or other devices which affect or control the three channel parameters/variables being measured and digitized, especially if simultaneous capture of instantaneous values of some of the parameters/variables is required. One application of the described conversion chip is a controller for an uninterruptible power supply system, in which values of the currents in each of the three phase conductors of a three phase power system are measured, digitized, compared with minimum acceptable values, and if the current values are below the minimum, the controller automatically turns on a back-up power system. In other applications, primary winding currents for several single phase motors can be controlled in response to positional information associated with elements driven by the motors. In general, many industrial process control applications in high electrical noise environments require sensing of multiple analog signals representative of process control parameters which sometimes must be simultaneously sensed, and rapid digitizing of the sensed analog signals to effectuate control of the process by a microcontroller receiving the digitized information. In general, some of the input signals, such as those designated POSA1, POSA2, etc., can be either digital or analog signals indicating position or other physical condiction such as velocity, temperature, etc. of a motor, heater, or other transducer. The described conversion chip 10 will be very attractive for use in such applications because of its high accuracy, high speed, low cost, all of which are achieved as a result of the features of the present invention.

What is claimed is:

1. A circuit for digitizing first and second analog signals for digital processing in a motor control system including a motor and a load driven by the motor, the circuit comprising in combination:

(a) first and second conductors conducting the first and second analog signals, respectively;

(b) an analog-to-digital conversion circuit including a CDAC having a charge summing conductor connected to an input of a bit decision comparator;

(c) first and second simultaneous sample and hold MSB circuits, the first simultaneous sample and hold MSB circuit including i. a first MSB switch circuit connected to a third conductor, a first sampling switch connected between the first conductor and the third conductor, and a first MSB capacitor having first and second terminals, the first terminal of the first MSB capacitor being connected to the third conductor, ii. a first isolation switch selectively coupling the second terminal of the first MSB capacitor to the first charge summing conductor during conversion of the first analog signal to a digital number, iii. a first MSB capacitor grounding switch coupling the second terminal of the first MSB capacitor to a reference voltage during simultaneous sampling of the first and second simultaneous sample and hold MSB circuits, the second simultaneous sample and hold MSB circuit including iv. a second MSB switch circuit connected to a fourth conductor, a second sampling switch connected between the second conductor and the fourth conductor, and a second MSB capacitor having first and second terminals, the first terminal of the second MSB capacitor being connected to the fourth conductor, v. a second isolation switch selectively coupling the second terminal of the second MSB capacitor to the charge summing conductor during conversion of the second analog signal to a digital number, and vi. a second MSB capacitor grounding switch coupling the second terminal of the second MSB capacitor to the reference voltage during simultaneous sampling of the first and second simultaneous sample and hold MSB circuits, whereby the first and second analog signals can be simultaneously sampled and held in the first and second simultaneous sample and hold MSB circuits, respectively, and then sequentially converted to digital numbers by the analog-to-digital conversion circuit.

2. A circuit for digitizing first and second analog signals for digital processing in a motor control system including a motor and a load driven by the motor, the circuit comprising in combination:

(a) first and second conductors conducting the first and second analog signals, respectively;

(b) an analog-to-digital conversion circuit including a CDAC having a charge summing conductor connected to an input of a bit decision comparator;

(c) a first simultaneous sample and hold MSB circuit coupled between the charge summing conductor and the first conductor, and a second simultaneous sample and hold MSB circuit coupled between the charge summing conductor and the second conductor, whereby the first and second analog signals can be simultaneously sampled and held in the first and second simultaneous sample and hold MSB circuits, respectively, and then sequentially converted to digital numbers by the analog-to-digital conversion circuit without resampling of either of the first and second simultaneous sample and hold MSB circuits.

3. A circuit for digitizing first and second differential analog signals for digital processing in a motor control system including a motor and a load driven by the motor, the circuit comprising in combination:

(a) first and second conductors conducting the first differential analog signal, and third and fourth conductors conducting the second differential analog signal;

(b) an analog-to-digital conversion circuit including a main CDAC having a first charge summing conductor and a trim CDAC having a second charge summing conductor;

(c) a bit decision comparator having a first input coupled to the first charge summing conductor and a second input coupled to the second charge summing conductor;

(d) first and second differential simultaneous sample and hold MSB circuits, the first differential sample and hold MSB circuit including i. a first MSB switch circuit connected to a fifth conductor, a first sampling switch connected between the first conductor and the fifth conductor, and a first MSB capacitor having first and second terminals, the first terminal of the first MSB capacitor being connected to the fifth conductor, ii. a first isolation switch selectively coupling the second terminal of the first MSB capacitor to the first charge summing conductor during conversion of the first differential analog signal to a digital number, iii. a first MSB capacitor grounding switch coupling the second terminal of the first MSB capacitor to a reference voltage during simultaneous sampling of the first and second differential simultaneous sample and hold MSB circuits, iv. a second MSB switch circuit connected to a sixth conductor, a second sampling switch connected between the second conductor and the sixth conductor, and a second MSB capacitor having first and second terminals, the first terminal of the second MSB capacitor being connected to the sixth conductor, v. a second isolation switch selectively coupling the second terminal of the second MSB capacitor to the second charge summing conductor during conversion of the first differential analog signal to a digital number, vi. a second MSB capacitor grounding switch coupling the second terminal of the second MSB capacitor to the reference voltage during simultaneous sampling of the first and second differential simultaneous sample and hold MSB circuits, the second differential simultaneous sample and hold MSB circuit including vii. a third MSB switch circuit connected to a seventh conductor, a third sampling switch connected between the third conductor and the seventh conductor, and a third MSB capacitor having first and second terminals, the first terminal of the third MSB capacitor being connected to the seventh conductor, viii. a third isolation switch selectively coupling the second terminal of the third MSB capacitor to the first charge summing conductor during conversion of the second differential analog signal to a digital number, ix. a third MSB capacitor grounding switch coupling the second terminal of the third MSB capacitor to the reference voltage during simultaneous sampling of the first and second differential simultaneous sample and hold MSB circuits, x. a fourth MSB switch circuit connected to an eighth conductor, a fourth sampling switch connected between the fourth conductor and the eighth conductor, and a fourth MSB capacitor having first and second terminals, the first terminal of the fourth MSB capacitor being connected to the eighth conductor, xi. a fourth isolation switch selectively coupling the second terminal of the fourth MSB capacitor to the second charge summing conductor during conversion of the second differential analog signal to a digital number, and xii. a fourth MSB capacitor grounding switch coupling the second terminal of the fourth MSB capacitor to the reference voltage during simultaneous sampling of the first and second differential simultaneous sample and hold MSB circuits, whereby the first and second differential analog signals can be simultaneously sampled and held in the first and second differential simultaneous sample and hold MSB circuits, respectively, and then sequentially converted to digital numbers by the analog-to-digital conversion circuit.

4. The circuit of claim 3 including selectable MSB trim circuitry, the selectable MSB trim circuitry including a first trim capacitor, first and second trim switches, and first and second resistive trim networks, a first terminal of the first trim capacitor being coupled to the second charge summing conductor, a second terminal of the first trim capacitor being coupled to a first terminal of each of the first and second trim switches, respectively, a second terminal of the first trim switch being coupled to the first resistive trim network, and a second terminal of the second trim switch being coupled to the second resistive trim network, the first trim switch selectively coupling the first trim capacitor to the first resistive trim network during conversion of the first differential analog signal to a digital number, the second trim switch selectively coupling the first trim capacitor to the second resistive trim network during conversion of the second differential analog signal to a digital number.

5. The circuit of claim 3 including selectable offset trim circuitry, the selectable offset trim circuitry including an offset trim capacitor, first and second offset trim switches, and first and second resistive offset trim networks, the offset trim capacitor having a first terminal coupled to the second charge summing conductor, the first offset trim switch being coupled between the first resistive offset trim network and a second terminal of the offset trim capacitor, and the second offset trim switch being coupled between the second resistive offset trim network and the second terminal of the offset trim capacitor, the first offset trim switch selectively coupling the first resistive offset trim network to the offset trim capacitor during conversion of the first differential analog signal to a digital number, the second offset trim switch selectively coupling the second resistive offset trim network to the offset trim capacitor during conversion of the second differential analog signal to a digital number.

6. An analog-to-digital converter for digitizing first and second analog signals, comprising in combination:

(a) first and second conductors conducting the first and second analog signals, respectively;

(b) a single analog-to-digital conversion circuit including a single CDAC having a charge summing conductor connected to an input of a bit decision comparator;

(c) a first simultaneous sample and hold MSB circuit coupled between the charge summing conductor and the first conductor, and a second simultaneous sample and hold MSB circuit coupled between the charge summing conductor and the second conductor, whereby the first and second analog signals can be simultaneously sampled and held in the first and second sample and hold MSB circuits, respectively, and then sequentially converted to digital numbers by the analog-to-digital conversion circuit.

7. An analog-to-digital converter circuit for digitizing first and second differential analog signals, comprising in combination:

(a) first and second conductors conducting the first differential analog signal, and third and fourth conductors conducting the second differential analog signal;

(b) an analog-to-digital conversion circuit including a main CDAC having a first charge summing conductor and a trim CDAC having a second charge summing conductor;

(c) a bit decision comparator having a first input coupled to the first charge summing conductor and a second input coupled to the second charge summing conductor;

(d) first and second differential simultaneous sample and hold MSB circuits, the first differential sample and hold MSB circuit including i. a first MSB switch circuit connected to a fifth conductor, a first sampling switch connected between the first conductor and the fifth conductor, and a first MSB capacitor having first and second terminals, the first terminal of the first MSB capacitor being connected to the fifth conductor, ii. a first isolation switch selectively coupling the second terminal of the first MSB capacitor to the first charge summing conductor during conversion of the first differential analog signal to a digital number, iii. a first MSB capacitor grounding switch coupling the second terminal of the first MSB capacitor to a reference voltage during simultaneous sampling of the first and second differential simultaneous sample and hold MSB circuits, iv. a second MSB switch circuit connected to a sixth conductor, a second sampling switch connected between the second conductor and the sixth conductor, and a second MSB capacitor having first and second terminals, the first terminal of the second MSB capacitor being connected to the sixth conductor, v. a second isolation switch selectively coupling the second terminal of the second MSB capacitor to the second charge summing conductor during conversion of the first differential analog signal to a digital number, vi. a second MSB capacitor grounding switch coupling the second terminal of the second MSB capacitor to the reference voltage during simultaneous sampling of the first and second differential simultaneous sample and hold MSB circuits, the second differential simultaneous sample and hold MSB circuit including     vii. a third MSB switch circuit connected to a seventh conductor, a third sampling switch connected between the third conductor and the seventh conductor, and a third MSB capacitor having first and second terminals, the first terminal of the third MSB capacitor being connected to the seventh conductor,     viii. a third isolation switch selectively coupling the second terminal of the third MSB capacitor to the first charge summing conductor during conversion of the second differential analog signal to a digital number,     ix. a third MSB capacitor grounding switch coupling the second terminal of the third MSB capacitor to the reference voltage during simultaneous sampling of the first and second differential simultaneous sample and hold MSB circuits,     x. a fourth MSB switch circuit connected to an eighth conductor, a fourth sampling switch connected between the fourth conductor and the eighth conductor, and a fourth MSB capacitor having first and second terminals, the first terminal of the fourth MSB capacitor being connected to the eighth conductor,     xi. a fourth isolation switch selectively coupling the second terminal of the fourth MSB capacitor to the second charge summing conductor during conversion of the second differential analog signal to a digital number, and     xii. a fourth MSB capacitor grounding switch coupling the second terminal of the fourth MSB capacitor to the reference voltage during simultaneous sampling of the first and second differential simultaneous sample and hold MSB circuits, whereby the first and second differential analog signals can be simultaneously sampled and held in the first and second differential simultaneous sample and hold MSB circuits, respectively, and then sequentially converted to digital numbers by the analog-to-digital conversion circuit.

8. A control system for controlling a motor coupled to drive a load, the load including a load position indicating device producing a first analog signal indicative of load shaft position or speed, the motor including a motor position indicating device producing a second analog signal indicative of motor position or speed, the motor receiving a plurality of pulse width modulated primary winding currents from a plurality of power switches, respectively, the control system comprising in combination:

(a) a microcontroller applying a plurality of pulse width modulated control signals to the power switches, respectively, and also producing a clock signal and a conversion signal;

(b) a plurality of current sensing devices coupled to the motor and producing a plurality of primary winding current indicating signals representative of the primary winding currents, respectively;

(c) a conversion circuit receiving the clock signal, the conversion signal, the first and second analog signals, and the primary winding current indicating signals and digitizing the first and second analog signals and the primary winding current indicating signals, the conversion circuit including     i. first and second conductors conducting first and second analog signals, respectively;

ii. an analog-to-digital converter circuit including a CDAC having a first charge summing conductor connected to a first input of a bit decision comparator;

iii. the first simultaneous sample and hold MSB circuit coupled between the first charge summing conductor and the first conductor, and a second simultaneous sample and hold MSB circuit coupled between the first charge summing conductor and the second conductor, whereby the first and second analog signals can be simultaneously sampled and held in the first and second sample and hold MSB circuits, respectively, then sequentially converted to digital numbers by the analog-to-digital converter circuit, and then utilized by the microcontroller to adjust the pulse width modulated control signals.

9. The control system of claim 8 wherein the first simultaneous sample and hold MSB circuit includes a first MSB switch circuit connected to a third conductor, a first sample switch connected between the first conductor and the third conductor, and a first MSB capacitor having first and second terminals, the first terminal of the first MSB capacitor being connected to the third conductor, a first isolation switch selectively coupling the second terminal of the first MSB capacitor to the first charge summing conductor during conversion of the first analog signal to a digital number, a first MSB capacitor grounding switch coupling the second terminal of the first MSB capacitor to a reference voltage during simultaneous sampling of the first and second simultaneous sample and hold MSB circuits, and wherein the second simultaneous sample and hold MSB circuit includes a second MSB switch circuit connected to a fourth conductor, a second sample switch connected between the second conductor and the fourth conductor, and a second MSB capacitor having first and second terminals, the first terminal of the second MSB capacitor being connected to the fourth conductor, a second isolation switch selectively coupling the second terminal of the second MSB capacitor to the charge summing conductor during conversion of the second analog signal to a digital number, and a second MSB capacitor grounding switch coupling the second terminal of the second MSB capacitor to the reference voltage during simultaneous sampling of the first and second simultaneous sample and hold MSB circuits.

10. The control system of claim 8 wherein the conversion circuit includes a digital-to-analog converter and a digital interface circuit that receives a serial digital input word during every conversion cycle of the analog-to-digital converter, the serial digital input word including an N-bit word for conversion to a first analog signal by the digital-to-analog converter, the digital interface circuit including a logic circuit synchronizing the conversion signal with respect to the clock signal and producing a latching signal synchronized with respect to the clock signal for latching each bit of the N-bit word into a shift register after various bit decisions are made by the bit decision comparator in the analog-to-digital converter, to thereby ensure that ground bounce noise produced in the analog-to-digital converter as a result of the latching of the bits of the N-bit word occurs only after the various bit decisions are made by the bit decision comparator and therefore do not significantly decrease accuracy of the bit decisions.

11. The control system of claim 8 wherein the CDAC includes a main CDAC having the first charge summing conductor and a trim CDAC having a second charge summing conductor, a second input of the bit decision comparator being coupled to the second charge summing conductor, wherein the first and second analog signals are differential signals, and wherein the first and second analog signals are simultaneously sampled by the first and second simultaneous sample and hold MSB circuits, respectively, whereby common mode noise on the first and second analog signals is rejected by the bit decision comparator before bit decisions are made thereby.

12. The control system of claim 11 including a first reference voltage conductor connected to the main CDAC and a second reference voltage conductor connected to the trim CDAC, a programmable reference voltage generating circuit including
  i. a reference circuit producing a first reference voltage on a first internal reference voltage conductor,
  ii. a first unity gain buffer circuit receiving the first reference voltage and producing a buffered second reference voltage on a second internal reference voltage conductor,
  iii. a resistive divider circuit coupled to receive the buffered second reference voltage and producing a plurality of divided-down reference voltages on a plurality of junction node conductors, respectively, of the resistive divider circuit,
  iv. a plurality of switches coupled between the main reference voltage conductor and the junction node conductors and responsive to a plurality of reference voltage selection signals respectively, for selectively applying the divided-down reference voltages to the first reference voltage conductor to thereby apply a selected reference voltage to the CDAC,
  v. a second unity gain buffer circuit receiving the selected reference voltage and producing a buffered third reference voltage on the second reference voltage conductor, whereby (1) noise generated by the first unity gain buffer circuit is divided down by the resistive divider circuit by the same ratio as the buffered second reference voltage so a noise-to-reference voltage ratio of the selected reference voltage is not reduced for lower values of the selected reference voltage, and (2) common mode noise on the first and second conductors is rejected by the bit decision comparator.

13. A system for digitizing a differential analog input signal, comprising in combination:

(a) first and second conductors conducting the differential analog input signal;

(b) an analog-to-digital converter including a CDAC having differential sample and hold circuitry coupled to receive a differential analog input signal from the first and second conductors and operatively coupled to sample and hold the differential input signal, the CDAC including first and second charge summing conductors coupled both to the differential sample and hold circuitry and to first and second inputs of a bit decision comparator, respectively;

(c) a main reference voltage conductor connected to the CDAC;

(d) a programmable reference voltage generating circuit including
  i. a reference circuit producing a first reference voltage on a first reference voltage conductor,
  ii. a first unity gain buffer circuit receiving the first reference voltage and producing a buffered second reference voltage on a second reference voltage conductor,
  iii. a resistive divider circuit coupled to receive the buffered second reference voltage and producing a plurality of divided-down reference voltages on a plurality of junction node conductors, respectively, of the resistive divider circuit,
  iv. a plurality of switches coupled between the main reference voltage conductor and the junction node conductors and responsive to a plurality of reference voltage selection signals, respectively, for selectively applying the divided-down reference voltages to the main reference voltage conductor to thereby apply a selected reference voltage to the CDAC, whereby (1) noise generated by the first unity gain buffer circuit is divided down by the resistive divider circuit by the same ratio as the buffered second reference voltage so a noise-to-reference voltage ratio of the selected reference voltage is not reduced for lower values of the selected reference voltage, and (2) common mode noise on the first and second conductors is rejected by the bit decision comparator.

14. A method for accurately digitizing a first differential analog signal in a high electrical noise environment by means of an analog-to-digital converter including a main CDAC coupled to a first charge summing conductor coupled to an input of a bit decision comparator and a trim CDAC coupled to a second charge summing conductor which is coupled to another input of the bit decision comparator, an output of the bit decision comparator being coupled to an input of a successive approximation register, the method comprising the steps of:

(a) conducting the first differential analog signal along a first pair of conductors to apply the first differential analog signal between an input of a first sample and hold MSB circuit in the first main CDAC and another input of a second sample and hold MSB circuit in the first trim CDAC;

(b) sampling and holding the voltages on the inputs of the first and second sample and hold MSB circuits, respectively, by charging up MSB capacitors in each of the first and second sample and hold MSB circuits to voltage levels representative of the voltages on the inputs of the first and second sample and hold MSB circuits, respectively;

(c) performing a plurality of charge distribution operations between (i) the MSB capacitor in the first sample and hold MSB circuit and bit capacitors coupled to the first charge summing conductor and (ii) the MSB capacitor in the second sample and hold MSB circuit and bit capacitors coupled to the second charge summing conductor, in accordance with bit signal outputs produced by the successive approximation register;

(d) applying voltages on the first and second charge summing conductors as a result of step (c) to the inputs of the bit decision comparator, respectively, whereby common mode noise produced on the first and second conductors by the high electrical noise environment is substantially rejected by the bit decision comparator and therefore does not result in substantial bit decision errors.

15. The method of claim 14 including adjusting effects of mismatches between corresponding capacitances in the main CDAC and the trim CDAC by trimming an amount of common mode capacitance coupled to one of the first and second charge summing conductors.

16. The method of claim 15 including providing a plurality of relatively small trim capacitors each connected by a corresponding interruptible link to each of the first and second charge summing conductors, respectively, wherein the adjusting includes interrupting one or more of the interruptible links to vary the amount of trim capacitance connected to one of the first and second charge summing conductors so as to compensate for the mismatches.

17. The method of claim 14 wherein the main CDAC includes a plurality of bit switch circuits each connected to a first reference voltage conductor, the method including selecting a value of a first reference voltage on the first reference voltage conductor commensurate with a maximum amplitude of the first differential analog signal and a full scale range of the analog-to-digital converter, the selecting including buffering an internal reference voltage to produce a buffered internal reference voltage including a noise component generated by the buffering, dividing the buffered internal reference voltage into a plurality of internal divided-down reference voltages by means of a resistive divider network, closing one of a plurality of switches to selectively connect one of the divided-down reference voltages to the first reference voltage conductor, whereby the noise component is divided down by the same factor as the buffered internal reference voltage and therefore does not substantially decrease a signal-to-noise ratio of the analog-to-digital converter as lower values of the internal divided-down reference voltages are selected to make the full scale range of the analog-to-digital converter commensurate with smaller maximum amplitudes of the first differential analog signal.

18. The method of claim 14 including serially latching a plurality of bits of digital information into a latch circuit during operation of the analog-to-digital converter, wherein latching of each of the bits produces a ground bounce noise signal of magnitude sufficient to cause bit decision errors by the bit decision comparator if the ground bounce noise signal were to occur at the times bit decisions are made, the method including delaying each latching until a most recent bit decision has been made by the bit decision comparator and a corresponding output level of the bit decision comparator has been latched into the successive approximation register, whereby the serial information is input to the latch circuit during a sequence of bit decision operations by the bit decision comparator without reducing the accuracy of the analog-to-digital converter.

19. The method of claim 17 including serially latching a plurality of bits of digital information into a latch circuit during operation of the analog-to-digital converter, wherein a plurality of the bits of digital information are decoded to close the one of the plurality of switches, and wherein latching of each bit produces a ground bounce noise signal of magnitude sufficient to cause bit decision errors by the bit decision comparator if the ground bounce noise signal were to occur at the times bit decisions are made, the method including delaying each latching until a most recent bit decision has been made by the bit decision comparator and a corresponding output level of the bit decision comparator has been latched into the successive approximation register, whereby the serial information is input to the latch circuit during a sequence of bit decision operations by the bit decision comparator without reducing the accuracy of the analog-to-digital converter.

20. The method of claim 14 wherein the main CDAC includes a third sample and hold MSB circuit coupled to the first charge summing conductor, and the trim CDAC includes a fourth sample and hold MSB circuit coupled to the second charge summing conductor, a second differential analog signal being applied between an input of the third sample and hold MSB circuit and an input of the fourth sample and hold MSB circuit, the method including sampling and holding voltages on the inputs of the third and fourth sample and hold MSB circuits, respectively, simultaneously with the sampling and holding of step (b), by charging up MSB capacitors in each of the third and fourth sample and hold MSB circuits to voltage levels representative of the voltages on the inputs of the third and fourth sample and hold MSB circuits, respectively, before performing step (c) and, after performing step (d), repeating steps (c) and (d) to perform analog-to-digital conversion of the second differential analog signal without resampling of the second differential analog signal.

* * * * *